Patented Jan. 12, 1926.

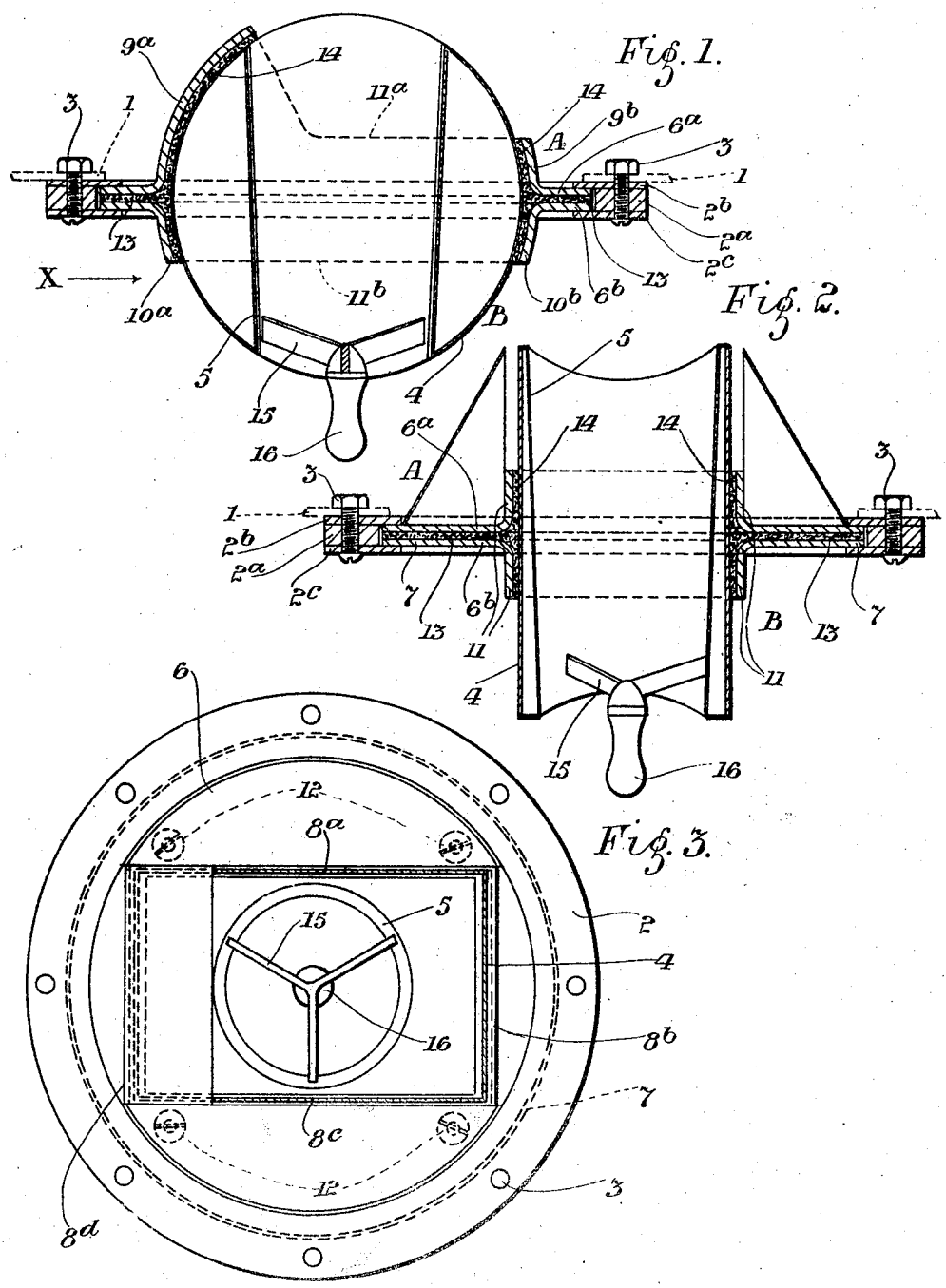

1,569,667

UNITED STATES PATENT OFFICE.

THOMAS NEILSON, OF GLASGOW, SCOTLAND.

AIR-DIRECTING DEVICE.

Application filed April 20, 1925. Serial No. 24,622.

*To all whom it may concern:*

Be it known that I, THOMAS NEILSON, of 11/41 Cogan Street, Pollokshaws, Glasgow, Scotland, a subject of the King of Great Britain, have invented certain new and useful Improved Air-Directing Devices, of which the following is a specification.

This invention relates to air directing devices for use in connection with ventilating or air supply systems of the kind in which the air can be directed as desired in any direction varying through a portion of a hemisphere.

Hitherto, various forms of directing devices have been used. In one form, particularly applicable to the ventilation of spaces aboard ship, the ventilator trunk has connected thereto a short length of flexible armoured hose, which serves as a director and can be moved or bent to different positions within the range of a hemisphere to deliver the air as required, but a separate control valve has to be provided with this arrangement.

According to another form, the ventilator trunk has connected to it a short length of piping pierced by a number of apertures over which a closely fitting sleeve having corresponding apertures is fitted, the whole forming a hit and miss valve. Of course, with such an arrangement the direction of flow of the air is limited to one plane.

Forms of ball and socket valves mounted in openings in the wall of the air duct or trunk have also been used, the socket in the form of a bearing ring, being rigidly secured to the wall in the opening and having an extended part adapted to permit of closing a passage through the ball or nozzle in a certain position thereof.

The object of the present invention is to provide an improved air directing device which shall be simple in construction and in manipulation.

According to this invention the air directing device has, in combination, a rotatable bearing ring and a nozzle rotatable in the said bearing ring, the rotational movements of the bearing ring and the nozzle being independent and about axes at right angles to each other.

In a preferred construction the air directing device comprises a rotatably mounted hollow cylinder having a tubular passage therein; a part-cylindrical bearing ring having a circular outer edge or flange; and a grooved coaming in which the said ring is rotatably mounted.

One embodiment of the invention suitable for a ships' air pressure ventilating system will now be described, by way of example, with reference to the accompanying drawings;—whereon:—

Fig. 1 is a sectional elevation of the air directing device.

Fig. 2 is a sectional side view thereof looking in the direction of the arrow in Fig. 1.

Fig. 3 is a plan view of the same.

The numeral 1 denotes the wall of a duct or trunk A along which air under pressure is passing while B is the space to which air is to be supplied.

A circular opening is cut in the wall 1 and around its edge a circular coaming 2, comprising a metal ring 2$^a$ and two inwardly projecting flanges 2$^b$ and 2$^c$, is secured by bolts 3, a groove being thus formed between the flanges.

The nozzle comprises a hollow metal cylinder 4 having a cross tube 5 of converging circular section, the tube forming fluid tight joints with the cylinder. The smaller end of the tube 5 opens into the space B while the larger end is in the duct or trunk A.

The cylinder 4 is rotatably carried in a bearing ring 6 which latter, in turn, is rotatable in the groove between the flanges 2$^b$ and 2$^c$ of the coaming 2.

The ring 6 is made in two separate metal portions 6$^a$ and 6$^b$, each having a circular outer edge 7 (indicated by a broken line in Fig. 3); a rectangular opening indicated by the lines 8$^a$, 8$^b$, 8$^c$, and 8$^d$ in Fig. 3 and flanges adjoining the edges of the said opening. The side flanges 9$^a$ and 9$^b$ on the portion 6$^a$ and the side flanges 10$^a$ and 10$^b$ on the portion 6$^b$, as shown in Fig. 1 are cylindrical surfaces conforming closely to the contour of the cylinder 4, the flange 9$^a$ being extended. The end flanges 11, shown in Fig. 2, are plane surfaces and are of the form shown in Fig. 1 by the broken lines 11$^a$ and 11$^b$. The flanges 11 fit closely over the cylinder 4.

The two parts 6$^a$ and 6$^b$ of the ring 6 are secured together by bolts 12 in the relative positions shown in the drawings, with soft packing 13 between them, the flanges thus forming a part-cylindrical bearing in which the cylinder 4 is located. Layers of soft packing 14, 14, are inserted between the bearing and the cylinder to form fluid tight joints, the cylinder being rotatable in the said bearing about its horizontal axis.

At the small end of the tube 5 which conducts the air from the duct A to the space B a spider 15, carrying a handle 16 is mounted, for convenience in operating the nozzle.

As hereinbefore stated, the nozzle is rotatably mounted by means of the circular part 7 of the bearing ring in the groove of the coaming 2 with the larger end of the tube 5 opening into the duct A and the smaller end opening into the space B. Consequently, by combining rotation of the cylinder and tube in the bearing ring with rotation of the bearing ring in the coaming 2, the axis of the tube can be made to occupy any position substantially throughout a hemisphere, the only restriction being the interference of the ring with the openings of the tube. Should it happen that, in some position of the nozzle, the extended flange 9$^a$ interferes with the passage of air through the nozzle, the bearing ring can be rotated in the coaming until the flange 9$^a$ is clear of the opening.

The air supply can be regulated by causing the flange 9$^a$ to cover, to a greater or less extent, the end of the tube 5.

It will be readily apparent that an air directing device constructed in accordance with the foregoing is effective over a wide range of positions, the range being only restricted by the narrow part of the bearing ring, since, as before explained, the flange 9$^a$, provided for closing the nozzle, need not restrict the opening. The construction and manipulation of the device are comparatively simple.

With an air directing device as hereinbefore described there is little or no tendency for the nozzle to shift its position due to vibration of its mounting, this being liable to occur with directing devices of the ball and socket type.

The invention is applicable not only to pressure systems of ventilation but also to suction systems and the director can be used for directing air from a space B to a space A if required.

Having now fully described my invention what I claim and desire to secure by Letters Patent is:—

1. An air directing device comprising, in combination, a rotatable bearing ring, means supporting said bearing ring, a part cylindrical socket on said bearing ring, and a nozzle rotatable in said socket and consisting of a cylinder having a tubular passage therethrough, the bearing ring and cylinder being independently rotatable about mutually perpendicular axes.

2. An air directing device comprising, in combination, a bearing ring, a fixed coaming in which said bearing ring is rotatable, a part cylindrical socket forming part of said bearing ring, and a nozzle rotatable in said socket and consisting of a cylinder having a tubular passage therethrough, the bearing ring and cylinder being independently rotatable about mutually perpendicular axes.

3. An air directing device comprising, in combination, a bearing ring, a fixed circular grooved coaming in which said bearing ring is rotatable, a socket with flat sides forming part of said bearing ring, a nozzle rotatable therein and consisting of a cylinder having a tubular passage therethrough, said bearing ring and said cylinder being independently rotatable about mutually perpendicular axes, and means for closing wholly or partially said tubular passage in certain positions of the cylinder relative to the socket.

4. An air directing device comprising, in combination, a bearing ring, a fixed circular grooved coaming in which said bearing ring is rotatable, a socket forming part of said bearing ring, a nozzle consisting of a cylinder having a tubular passage therethrough rotatable in said socket, and an extension of the wall of the socket adapted to close wholly or partially said tubuar passage in certain positions thereof relative to said socket, said cylinder and said bearing ring being independently rotatable about mutually perpendicular axes.

5. An air directing device comprising, in combination, a bearing ring, a fixed circular grooved coaming in which said bearing ring is rotatable, a socket forming part of said bearing ring which is made up of two portions joined together in the plane of the coaming, a nozzle consisting of a cylinder having a tubular passage therethrough rotatable in said socket, and an extension of the wall of the socket adapted to close wholly or partially said tubular passage in certain positions thereof relative to said socket, said cylinder and said bearing ring being independently rotatable about mutually perpendicular axes.

In testimony whereof I affix my signature.

THOMAS NEILSON.